Patented June 8, 1954

2,680,726

UNITED STATES PATENT OFFICE 2,680,726

ANTIMONY MERCAPTOESTERS AND CHLORINATED ORGANIC COMPOUNDS STABILIZED THEREWITH

Elliott L. Weinberg, Long Island City, N. Y., and Ernest W. Johnson and Clarence Kenneth Banks, Westfield, N. J., assignors to Metal & Thermit Corporation, New York, N. Y., a corporation of New Jersey No Drawing. Application November 17, 1951,
Serial No. 256,954

10 Claims. (Cl. 260—30.6)

The present invention relates to antimony SS'S" trimercaptoacid ester compounds having utility as stabilizing agents for chlorinated hydrocarbons and the like, and to processes for manufacturing the same.

In accordance with the present invention, the new group of antimony SS'S" trimercaptoacid ester compounds may be generally designated as condensation products of antimony compounds with mercapto acid esters. More particularly these compounds may be illustrated by the following structural formula:

$$Sb(SRCOOR')_3$$

wherein R is selected from the group consisting of alkylene, arylene, and aralkylene radicals and R' is a substituted or unsubstituted alkyl, aryl or mixed aryl-alkyl group. Thus R may be derived from mercapto acetic, B-mercaptopropionic, thiomalic, thiosalicylic acids, etc. Similarly, R' may be derived from decanols, glycerol, glycol monoesters, dihydroabietyl alcohol, phenoxyethanol, etc.

The antimony SS'S" trimercaptoacid esters of the present invention are stabilizers for chlorinated hydrocarbons in quantities as low as two percent of the weight of the resin. This stabilizing property is equally applicable to resin plasticizer compositions, such as the phthalate type plasticizers.

These compounds may be prepared in any suitable manner. It has been found however that these products may be prepared in high yield and purity by reacting an antimony compound with a mercapto acid ester and recovering a reaction product having the desired Sb—S linkage. More specifically, an antimony oxide, particularly the trioxide, may be condensed with a mercapto acid ester to produce products of the above structural formula.

The reaction mechanism for the formation of the antimony SS'S" trimercaptoacid esters using antimony trioxide is clearly illustrated by the following equation:

$$Sb_2O_3 + 6(HSRCOOR') \rightarrow 2Sb(SRCOOR')_3 + 3H_2O$$

This equation graphically shows that the reaction occurs between the mercapto radical and the antimony oxide whereby water splits off and a chemical bond is formed between the antimony and the sulfur.

It is within the scope of this invention that pure, impure or commercial grades of the reactants may be employed satisfactorily. In general, pure compounds of the above formulas may be prepared from pure raw materials. However, these compounds may be diluted with innocuous, inert materials, thereby permitting the use of technical materials or intermediates in their preparation.

Any suitable reaction temperatures may be employed. It is ordinarily preferred to use room temperature. However, the presence of the water produced by the condensation reaction usually requires an additional heating or refluxing in order to strip said water from the reaction product, though it may be removed in any suitable manner.

Another embodiment of this invention is the use of inert organic solvents as the medium for the reaction, such as toluene, benzene, methyl alcohol, etc. The presence of such solvent facilitates the desired reaction. The solvent may be eliminated from the reaction product at the completion of the reaction in any suitable manner, such as by vaporizing the solvent under vacuum at elevated temperatures.

The following examples are further illustrative of these novel antimony SS'S" trimercaptoacid esters and their preparation, and it will be understood that the invention is not limited thereto:

EXAMPLE I

Three moles of nonyl(3,5,5 trimethyl hexyl) mercaptoacetate, prepared by reacting equimolar amounts of nonyl alcohol and mercaptoacetic acid, were placed in a reaction flask fitted with a stirrer, Barrett moisture trap and thermometer. 200 ml. of toluene and ½ mole of $Sb_2O_3$ were added to the ester with stirring. A slightly exothermic reaction occurred. The reaction vessel was heated to reflux the toluene and to remove the water. The toluene was then stripped in vacuo, leaving a residue of antimony SS'S" tri (nonyl mercaptoacetate), which is a mobile, slightly yellow liquid.

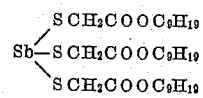

EXAMPLE II

Three moles of octadecyl thiomalate, prepared by reacting equivalent amounts of octadecyl alcohol and thiomalic acid, were placed in a reaction flask fitted with a stirrer, Barrett moisture trap and thermometer. 200 ml. of toluene and ½ mole of $Sb_2O_3$ were added to the ester with stirring. A slightly exothermic reaction occurred. The reaction vessel was heated to reflux the toluene and to remove the water. The toluene was then stripped in vacuo, leaving a residue of antimony SS'S'' tri(octadecyl thiomalate).

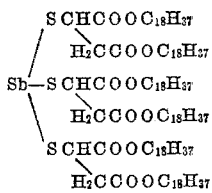

EXAMPLE III

Three moles of decyl mercaptoacetate were placed in a reaction flask fitted with a stirrer, Barrett moisture trap and thermometer. 200 ml. of toluene and ½ mole of $Sb_2O_3$ were added to the ester with stirring. A slightly exothermic reaction occurred. The reaction vessel was heated to reflux the toluene and to remove the water. The toluene was then stripped in vacuo, leaving a residue of antimony SS'S'' tri(decyl-mercaptoacetate).

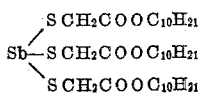

EXAMPLE IV

Three moles of glycerol monoricinoleate monomercaptoacetate were placed in a reaction flask fitted with a stirrer, Barrett moisture trap and thermometer. 200 ml. of toluene and ½ mole of $Sb_2O_3$ were added to the ester with stirring. A slightly exothermic reaction occurred. The reaction vessel was heated to reflux the toluene and to remove the water. The toluene was then stripped in vacuo, leaving a residue of antimony SS'S'' tri(glycerol monoricinoleate monomercaptoacetate), which is clear.

EXAMPLE V

Three moles of dihydroabietyl mercaptoacetate were placed in a reaction flask fitted with a stirrer, Barrett moisture trap and thermometer. 200 ml. of toluene and ½ mole of $Sb_2O_3$ were added to the ester with stirring. A slightly exothermic reaction occurred. The reaction vessel was heated to reflux the toluene and to remove the water. The toluene was then stripped in vacuo, leaving a residue of antimony SS'S'' tri(dihydroabietyl mercaptoacetate) which is clear.

It has also been discovered and is a feature of this invention that the antimony SS'S'' tri(mercaptoacid ester) will function as stabilizers for chlorinated hydrocarbon compositions, particularly vinyl chloride-containing resin compositions containing plasticizers, and when intimately dispersed therein, will provide liquid to rigid solid compositions of improved resistance to heat and light deterioration. Excellent films are obtained from the aforesaid plastic compositions which exhibit a high degree of stability. The optimum concentration of the antimony SS'S'' tri(mercaptoacid ester) useful as a stabilizer is up to 10% based on the weight of the resin, 2% being preferred. The resin composition containing this preferred concentration of stabilizer produces a stable plastic film, which does not darken at elevated temperatures as evidenced by the results of the heat tests in Table I.

The vinyl resins employed were polyvinyl chloride resins. The stabilizer was incorporated into a mixture of 100 parts by weight of resin and 50 parts by weight of the plasticizer, dioctyl phthalate, or a mixture of 40 parts dioctyl phthalate, 10 parts phosphate plasticizer and .5 part of calcium stearate.

The mixture was then milled to 40 mil. thickness on a two-roll differential speed mill. A sample of the 40 mil. sheet was then press-polished. Four strips (1" x 4") were then oven-aged at 320° F. for 1, 2, 3, 4 hours respectively. The milled sheet was clear and colorless.

Table I

| Composition | | | Appearance after heat aging | | | |
|---|---|---|---|---|---|---|
| Stabilizer | resin | plasticizer | 1 hr. | 2 hr. | 3 hr. | 4 hr. |
| None | 100 pts. vinyl chloride containing resin. | 50 pts. dioctyl phthalate. | reddish | black | black | black. |
| 2 pts. dibutyl tin dilaurate | Same | Same | yellow | reddish brown | black | black. |
| 2 pts. Sb. SS'S'' tri(nonyl mercapto-acetate). | Same | Same | slightly cloudy and colorless. | slightly cloudy and colorless. | cloudy and slightly yellow. | cloudy and tan. |
| 2 pts. SbS, S'S'' Tri(nonyl mercapto-acetate). | Same | 40 pts. dioctyl phthalate; 10 pts. alkylaryl phosphate; 0.5 pt. calcium stearate. | clear, colorless | slightly cloudy, yellow. | slightly cloudy, yellow. | slightly cloudy, tan. |
| 2 pts. SbS, S'S'' tri(dihydroabietyl mercaptoacetate). | Same | Same | clear, very slight yellow. | clear, very slight yellow. | clear, slight yellow. | clear, yellow. |

This table clearly discloses the stabilizing activity of these antimony SS'S'' tri(mercaptoacid esters) in comparison to unstabilized resin films as well as films stabilized with known stabilizers as evidenced by the light tan color of the film stabilized with the antimony SS'S'' tri(mercaptoacid esters) even after 4 hours of heat aging as against the black colors of the unstabilized resin film at the end of 2 hours and of the prior art stabilized film at the end of 3 hours. Furthermore, the prior art stabilized film clearly shows evidence of deterioration at the end of 2 hours.

Other uses of the antimony mercapto acid and mercapto acid ester derivatives are as stabilizers for other chlorinated materials, as rubber accelerators, rubber antioxidants, lube oil additives and polymerization accelerators.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. Antimony SS'S'' tri(octadecyl thiomalate).

2. A heat and light stable composition comprising a chlorinated organic compound which dehydrohalogenates when heated and intimately dispersed therein an antimony SS'S'' tri(mercaptoacid ester) of the formula $Sb(SRCOOR')_3$ wherein R is selected from the class consisting of an alkylene, arylene, and aralkylene radicals, and R' is a member of the class consisting of alkyl, aryl and aralkyl groups.

3. A stable vinyl chloride resin composition containing intimately dispersed therein an antimony SS'S'' tri(mercaptoacid ester) of the formula Sb(SRCOOR')$_3$ wherein R is selected from the class consisting of an alkylene, arylene, and aralkylene radicals, and R' is a member of the class consisting of alkyl, aryl and aralkyl groups.

4. A stable vinyl chloride resin composition containing intimately dispersed therein about 2% by weight of an antimony SS'S'' tri(mercaptoacid ester) of the formula Sb(SRCOOR')$_3$ wherein R is selected from the class consisting of an alkylene, arylene, and aralkylene radicals, and R' is a member of the class consisting of alkyl, aryl and aralkyl groups based on the weight of the resin.

5. A stable vinyl chloride resin composition containing a plasticizer, and an antimony SS'S'' tri(mercaptoacid ester) of the formula Sb(SRCOOR')$_3$ wherein R is selected from the class consisting of an alkylene, arylene, and aralkylene radicals, and R' is a member of the class consisting of alkyl, aryl and aralkyl groups as a stabilizing agent intimately dispersed therein.

6. A stable vinyl chloride resin composition containing a phosphate placticizer, and an antimony SS'S'' tri(mercaptoacid ester) of the formula Sb(SRCOOR')$_3$ wherein R is selected from the class consisting of an alkylene, arylene, and aralkylene radicals, and R' is a member of the class consisting of alkyl, aryl and aralkyl groups as a stabilizing agent intimately dispersed therein.

7. A stable vinyl chloride resin composition containing intimately dispersed therein about 2% by weight of antimony SS'S'' tri(nonyl mercaptoacetate) based on the weight of the resin.

8. A stable vinyl chloride resin composition containing intimately dispersed therein about 2% by weight of antimony SS'S'' tri(octadecyl thiomalate) based on the weight of the resin.

9. A stable vinyl chloride resin composition containing intimately dispersed therein about 2% by weight of antimony SS'S'' tri(dihydroabietyl mercaptoacetate) based on the weight of the resin.

10. A heat and light stable composition comprising a chlorinated organic compound which dehydrohalogenates when heated and intimately dispersed therein up to 10% by weight of an antimony SS'S'' tri(mercaptoacid ester) of the formula Sb(SRCOOR')$_3$ wherein R is selected from the class consisting of an alkylene, arylene, and aralkylene radicals, and R' is a member of the class consisting of alkyl, aryl and aralkyl groups.

References Cited in the file of this patent

UNITED STATES PATENTS

| Number | Name | Date |
|---|---|---|
| 1,689,366 | Schoeller | Oct. 30, 1928 |

FOREIGN PATENTS

| Number | Country | Date |
|---|---|---|
| 552,447 | Germany | June 1932 |

OTHER REFERENCES

Christiansen, Organic Derivatives of Antimony, p. 198 (1925), The Chemical Catalog Co., N. Y.